United States Patent [19]

Hayward et al.

[11] 3,950,545

[45] Apr. 13, 1976

[54] BAKED PRODUCT CONTAINING PROTEIN AND VITAMINS AND PROCESS FOR PREPARING SAME

[75] Inventors: James R. Hayward, McHenry; William L. Keyser, East Dundee; Paul W. Swanson, Crystal Lake; Walter J. Zielinski, Ingleside, all of Ill.

[73] Assignee: The Quaker Oats Company, Chicago, Ill.

[22] Filed: Jan. 23, 1975

[21] Appl. No.: 543,330

[52] U.S. Cl. .................. 426/72; 426/73; 426/74; 426/94; 426/99; 426/302; 426/551; 426/659
[51] Int. Cl.² .......................................... A23L 1/30
[58] Field of Search ....... 426/72, 73, 311, 302, 307, 426/551, 553, 659

[56] References Cited
UNITED STATES PATENTS

| | | | |
|---|---|---|---|
| 3,343,965 | 9/1967 | Gass | 426/553 |
| 3,556,814 | 1/1971 | Whitman et al. | 426/307 |
| 3,753,734 | 8/1973 | Kaplon et al. | 426/553 |
| 3,767,824 | 10/1973 | Keyser et al. | 426/73 |
| 3,814,819 | 6/1974 | Morgan | 426/553 |

*Primary Examiner*—Raymond N. Jones
*Attorney, Agent, or Firm*—Charles J. Hunter; Donnie Rudd

[57] ABSTRACT

A highly nutritional baked product, high in both protein content and vitamin content, stable against loss of protein efficiency ratio and vitamin potency, and further stable against staling and microbial growth and process for preparing same is disclosed. The product is additionally shelf stable, requires no refrigeration, is low in calories, high in nutrition, low in cholesterol and low in reducing sugars. The product contains added vitamins and minerals and protein. Water content must be maintained between 15% and 45%, and the product is stabilized by having at least about 15% by weight of sugar or sugar equivalents with at least 3% by weight of a polyhydric alcohol in the base. The product may have a sugar containing topping and has a frosting containing vegetable oil or fat coated vitamins.

20 Claims, No Drawings

BAKED PRODUCT CONTAINING PROTEIN AND VITAMINS AND PROCESS FOR PREPARING SAME

BACKGROUND OF THE INVENTION

1. Field of the Invention

This invention relates to an intermediate moisture, highly nutritional baked product, high in protein content, mineral content, and vitamin content, and stable against loss of protein efficiency ratio and vitamin potency and further stable against staling and microbial growth. The product is additionally shelf stable, requires no refrigeration, is low in calories, high in nutrition, low in cholesterol, and low in reducing sugars. The product is baked and then coated with a specified frosting containing vitamins. This invention also relates to the process for producing the aforementioned product.

2. Description of the Prior Art

Intermediate moisture products, i.e., products having a moisture content between about 15 and 45% by weight, have heretofore been shown to be stablized by including therein a sugar or sugar equivalent. Many different types of food products have been produced using this method of stabilization. Among the earlier such products were the pet food products wherein sugar or polyhydric alcohols were used to stabilize meat against deteoriation. Recently, developments have been forthcoming wherein baked products have used polyhydric alcohol for part of the stabilization thereof. These products, however, have all been low in protein efficiency ratio and shown a great deteoriation of protein efficiency after being baked. This is due primarily to the severe conditions necessary for the baking and the reducing sugars present. Furthermore, the products have tended to become rancid or stale within a short period of time regardless of the attempts made for stabilization. No one prior to this invention has found a method for making baked products high in protein content and still avoiding staling. This invention overcomes this problem. In addition to the problem of staleness associated with baked products that are high in moisture content and high in protein content, there has also been a serious problem in having these baked products contain all of the vitamins necessary for a balanced nutritional diet. In other words, many of the vitamins that are necessary in a human diet are oxidized or otherwise rendered impotent due to the temperature conditions necessary for creating a baked product. It has not previously been shown that vitamins could be put in a baked product in a significant amount, i.e., in the U.S. Recommended Dietary Allowance, without destroying the vitamins. This invention, again, overcomes this problem. In addition to all of the above, no one has yet discovered a highly nutritious vitamin containing shelf stable, baked product which still has excellent texture and taste in addition to its nutritional benefits. In addition, normal baked products utilize wheat starch and gluten as a portion of the wheat flour that is used therein. All such products use at least 10% wheat flour for producing the product. In normal baking, wheat gluten forms a structure and this gluten is denatured during the baking and the structure formed by the starch then gives the structure and texture of the product. The problem with this is that the starch necessary to give the structure and the texture is the constituent of the product that stales and soon makes the product unacceptable. This invention overcomes this problem. Further in addition, all baked products are not shelf stable for a long period of time, they are high in calories due to added sugar, they are low in nutrition as compared to calories, they are rather high in cholesterol due to added fat, and high in reducing sugars to give a browning reaction. The product of this invention uses opposing theories for baking and comes up with an excellent product which is not only shelf stable without refrigeration, but is low in calories in comparison to the high amount of nutrition and is low in cholesterol and low in reducing sugars. This invention overcomes all of the deficiencies of prior known baked products and produces a new and novel baked product which is good tasting and is superior in all respects to everything heretofore known.

SUMMARY OF THE INVENTION

It is an object of this invention to produce a highly nutritional baked product.

It is another object of this invention to produce a highly nutritional baked product, high in protein content and mineral and vitamin content.

It is still another object of this invention to provide a highly nutritional baked product, high in both protein content and vitamin content, and stable against loss of protein efficiency ratio and vitamin potency.

It is still another object of this invention to provide a shelf stable, highly nutritional baked product, high in both protein content and vitamin content, stable against loss of protein efficiency ratio and vitamin potency, and further stable against staling and microbial growth.

It is still another of this invention to provide a baked product having therein large amounts of stabilized vitamins.

It is still another object of this invention to provide a complete highly stable baked product system.

It is still another object of this invention to provide a process for producing a highly nutritional baked product.

It is still a further object of this invention to provide a process for producing a highly nutritional baked product, high in both protein content and vitamin content.

It is still another object of this invention to provide a process for producing a highly nutritional baked product, high in both protein content and vitamin content and stable against loss of protein efficiency ratio and vitamin potency.

It is still another object of this invention to provide a process for producing a highly nutritional baked product high in both protein content and vitamin content, stable against loss of protein efficiency ratio and vitamin potency, and further stable against staling and microbial growth.

It is still another object of this invention to provide a process for producing a new system for producing a highly nutritional baked product.

The objects of this invention are accomplished by a highly nutritional baked product, high in both protein content and vitamin content, stable against loss of protein efficiency ratio and vitamin potency, and futher stable against staling and microbial growth, said product being shelf stable, not requiring refrigeration for preservation, said product further being low in calories, high in nutrition, low in cholesterol and low in reducing sugars, said baked product comprising: a baked base having less than about 10% by weight wheat flour therein and comprising cereal flour, non-yeast chemical leavening, sufficient protein from a protein source to give a minimum protein content in the total product of 9% by weight, said protein source comprising a member selected from the group comprising egg protein, casein, caseinate salts, and vegetable protein, with said vegetable protein not contributing more than 10% by weight wheat flour when combined with all other wheat flour in the product and said protein source having both egg protein and casein or caseinate salts as a part thereof, water in an amount sufficient to give a final moisture content of the baked product of from 15% to 45% by weight, and at least about 15% by weight of a stabilizing member selected from the group comprising sugar and sugar equivalents with the stabilizing member contributing at least about 3% by weight polyhydric alcohol to the total base and vitamins and minerals; and a frosting containing vegetable oil or fat coated vitamins, said base comprising a major portion by weight of the product, and said product having a water activity coefficient, $A_w$, of less than 0.87.

In the above, it is preferable that said base have thereon a sugar containing topping.

Further in the above, it is preferable that said base contain added vitamin $B_1$ and said frosting contain vitamins C and $B_{12}$ and iodine.

Also further in the above, it is preferable that the vegetable oil or fat coated vitamins comprise vitamins coated with a fatty material, said fatty material comprising a saturated aliphatic acid having between 12 and 20 carbon atoms inclusive or a glyceride having the formula:

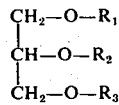

wherein $R_1$ is an acyl radical derived from a saturated aliphatic acid having between 12 and 20 carbon atoms per molecule, and $R_2$ and $R_3$ are hydrogen or the same as $R_1$, said fatty material having a melting point of from 100° to 200°F.

In the above it is even further preferable that the product be enclosed by an air impermeable container containing a water converting catalyst and surrounded by a hydrogen containing atmosphere in the container having no more than about 4% by weight oxygen.

And, further in the above, it is preferable that the frosting comprise from about 30% to about 40% by weight vegetable oil or fat, from about 10% to 40% by weight sugar, from about 25% to about 50% by weight milk solids and preferably nonfat dry milk solids and a flavoring agent.

The objects of this invention are additionally accomplished by a highly nutritional baked product, high in both protein content and vitamin content, stable against loss of protein efficiency ratio and vitamin potency, and further stable against staling and microbial growth, said product being shelf stable, not requiring refrigeration for preservation, said product further being low in calories, high in nutrition, low in cholesterol and low in reducing sugars, said baked product comprising: a baked base having less than about 10% by weight wheat flour therein and comprising between 5% and 15% by weight cereal flour, non-yeast chemical leavening, sufficient protein from a protein source to give a minimum protein content in the total product of 9% by weight, said protein source comprising at least 4% by weight, based on the weight of the base, of a caseinate salt and at least 4% by weight, based on the weight of the base, of egg or egg parts, water in an amount sufficient to give a final moisture content of the baked product of from 15% to 25% by weight, from 4% to 15% by weight glycerol, added vitamins, and from 10% to 20% by weight sugar; and a frosting containing vegetable oil or fat coated vitamins, said base comprising a major portion by weight of the product, and said product having a water activity coefficient, $A_w$, of less than 0.87.

The objects of this invention are additionally accomplished by a process for producing a highly nutritional baked product, high in both protein content and vitamin content, stable against loss of protein efficiency ratio and vitamin potency, and further stable against staling and microbial growth, said product being shelf stable, not requiring refrigeration for preservation, said product further being low in calories, high in nutrition, low in cholesterol, and low in reducing sugars, said process comprising:

A. preparing a base having therein less than about 10% by weight wheat flour by admixing cereal flour, non-yeast chemical leavening, protein, water, vitamins and a stabilizing member, said protein containing some egg albumin and some casein or caseinate salts, said casein or caseinate salts being first coated with a vegetable oil or fat, and said protein comprising a protein material selected from the group egg parts, casein and caseinate salts, and vegetable protein, said water being admixed in an amount sufficient to give a total moisture content in the final product of from 15–45% by weight, and said stabilizing member contributing at least about 4% by weight polyhydric alcohol to the total base and comprising a member selected from the group sugar and sugar equivalents;

B. baking the base; and

C. coating a portion of the baked base with a frosting containing vegetable oil or fat coated vitamins.

In the above, it is preferable that the frosting comprise vitamins coated with a fatty material with said fatty material comprising a saturated aliphatic acid having between 12 and 20 carbon atoms inclusive or a glyceride having the formula:

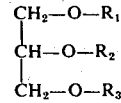

wherein $R_1$ is an acyl radical derived from a saturated aliphatic acid having between 12 and 20 carbon atoms per molecule, and $R_2$ and $R_3$ are hydrogen or the same as $R_1$, and wherein the fatty material has a melting point of from 100° to 200°F.

In the above it is also preferable to include placing a water converting catalyst and the coated baked product in a container, displacing the air in the container with a hydrogen containing atmosphere having not more than about 4% by weight oxygen, and sealing the container to prevent further oxygen from reaching the product.

Also preferable in the above is including placing the product in a container, flushing the atmosphere with an inert gas to remove a major portion of the oxygen therefrom and then again flushing the container with an inert gas until no more than 10% by weight of the atmosphere therein is oxygen and then sealing the container to prevent additional oxygen from reaching the product.

It is also preferable in the above to include putting a sugar containing topping on the base bafore baking.

In the above, it is preferable where said base contains added vitamin $B_1$ and said frosting contains vitamins C and $B_{12}$ and iodine.

In the above process it is further preferable that the frosting comprise from about 30% to about 40% by weight vegetable oil or fat, from about 10% to 40% by weight sugar, from about 25% to about 50% by weight nonfat dry milk solids and a flavoring agent.

The objects of this invention are additionally accomplished by a process for producing a highly nutritious baked product high in both protein content and vitamin content, stable against loss of protein efficiency ratio and vitamin potency and further stable against staling and microbial growth, said product being shelf stable, not requiring refrigeration for preservation, said product further being low in calories, high in nutrition, low in cholesterol and low in reducing sugars, said process comprising:

A. preparing a base having therein less than about 10% by weight wheat flour by admixing cereal flour, non-yeast chemical leavening, protein, water, and a stabilizing member, said protein comprising egg protein and vegetable oil or fat coated sodium caseinate each in an amount sufficient to contribute at least 4% by weight of the base and said water being admixed in an amount sufficient to give a total moisture content in the final product of from 15% to 25% by weight, and said stabilizing member comprising at least 4% by weight, based on the weight of the base, of glycerol and at least 10% by weight, based on the weight of the base, of sugar and added vitamins;

B. baking the base;

C. coating a portion of the baked base with a frosting containing a vegetable oil or fat coated vitamin;

D. inserting the coated product into a container along with a water converting catalyst;

E. displacing the atmosphere in the container with a hydrogen containing atmosphere containing not more than about 4% by weight oxygen; and F. sealing the container to prevent further oxygen from reaching the material.

The objects of this invention are additionally accomplished by a process for producing a highly nutritional baked product, high in both protein content and vitamin content, stable against loss of protein efficiency ratio and vitamin potency, and further stable against staling and microbial growth, said product being shelf stable, not requiring refrigeration for preservation, said product further being low in calories, high in nutrition, low in cholesterol and low in reducing sugars, said process comprising:

A. preparing a base having therein less than about 10% by weight wheat starch by admixing cereal flour, non-yeast chemical leavening, protein, water, vitamins and a stabilizing member, said protein containing some egg protein and some vegetable oil or fat coated casein or caseinate salts and comprising a protein material selected from the group egg protein, vegetable oil or fat coated casein and caseinate salts, and vegetable protein, said water being admixed in an amount sufficient to give a total moisture content in the final product of from 15% to 45% by weight, and said stabilizing member contributing at least about 3% by weight polyhydric alcohol to the total base and comprising a member selected from the group sugar and sugar equivalents;

B. baking the base;

C. preparing fat coated vitamins by admixing from 5 to 50 parts by weight vitamins with from 95 to 50 parts by weight of edible liquified fatty material with a cooling agent, said cooling agent having a temperature below 32°F., said cooling agent being admixed in an amount sufficient to solidify the mixture and maintain the mixture solidified throughout the vitamin coating process, with said cooling agent being nontoxic and chemically inert with respect to the vitamins and fatty material; subdividing the total fatty material-vitamin mixture until a major portion thereof passes through a No. 20 U.S. Sieve but has a particle size above 75 microns; and removing the cooling material therefrom by sublimation or evaporation;

D. adding the fat coated vitamins to a frosting; and

E. coating a portion of the baked base with the frosting containing the fat coated vitamins.

In the above, it is preferable that the frosting comprise from about 30 percent to about 40 percent by weight vegetable oil or fat, from about 10 percent to 40 percent by weight sugar, from about 25 percent to about 50 percent by weight nonfat dry milk solids and a flavoring agent.

The objects of this invention are additionally accomplished by a process for producing a highly nutritious baked product high in both protein content and vitamin content, stable against loss of protein efficiency ratio and vitamin potency and further stable against staling and microbial growth, said product being shelf stable, not requiring refrigeration for preservation, said product further being low in calories, high in nutrition, low in cholesterol and low in reducing sugars, said process comprising:

A. preparing a base having therein less than about 10% by weight wheat flour by admixing cereal flour, non-yeast chemical leavening, protein, water, vitamins and a stabilizing member, said protein comprising egg protein and vegetable oil or fat coated sodium caseinate each in an amount sufficient to contribute at least 4% by weight of the base and said water being admixed in an amount sufficient to give a total moisture content in the final product of from 15% to 25% by weight, and said stabilizing member comprising at least 3% by weight, based on the weight of the base, of glycerol and at least 10% by weight, based on the weight of the base, of sugar;

B. baking the base;

C. preparing fat coated vitamins by admixing from 5 to 50 parts by weight vitamins with from 95 to 50 parts by weight of edible liquified fatty material with a cooling agent, said cooling agent having a temperature below 32°F., and said cooling agent being admixed in an amount sufficient to solidify the mixture and maintain the mixture solidified throughout the vitamin coating process, with said cooling agent being nontoxic and chemically inert with respect to the vitamins and fatty material; subdividing the total fatty material-vitamin mixture until a major portion thereof passes through a No. 20 U.S. Sieve but has a particle size above 100 microns; and removing the cooling material therefrom by sublimation or evaporation;

D. adding the coated vitamins to a frosting;

E. coating a portion of the baked base with the frosting containing the vegetable oil or fat coated vitamin;

F. inserting the coated product into a container along with a water converting catalyst;

G. displacing the atmosphere in the container with a hydrogen containing atmosphere containing not more than about 4% by weight oxygen; and H. sealing the container to prevent further oxygen from reaching the material.

In the above, it is preferable that the frosting comprise from about 30 percent to about 40 percent by weight vegetable oil or fat, from about 10 percent to 40 percent by weight sugar, from about 25 percent to about 50 percent by weight nonfat dry milk solids and a flavoring agent.

In the above, it is also preferable that the water converting catalyst is eliminated and displacing of the atmosphere is accomplished by a double inert gas flushing.

The new and novel product of this invention is highly nutritional, is high in protein content and mineral and vitamin content. It is preferable, for instance, to have greater than 10%, based on the weight of the product, of protein comprising a sufficient balance of essential amino acids thereby giving a high protein equivalency ratio. In addition, the product can have at least 25% by weight of the United States Required Daily Adult Allowance of vitamins A, D, C, $B_1$, $B_2$, $B_6$, $B_{12}$, niacin, and the minerals calcium, phosphorous, iron, zinc, and magnesium.

In addition to having the high protein content and vitamin and mineral content, this product is stable against loss of protein efficiency ratio and vitamin potency. In other words, there will not be a significant loss of the protein efficiency during normal storing periods for the product. More specifically, the product may be stored for several months without significantly loosing its protein efficiency ratio. In addition, the vitamin potency of all of the vitamins as long as they are added within the scope of this invention, is not significantly lost at any time during storage, and may be consumed in their potent state.

In addition to having good protein efficiency ratio stability and vitamin potency stability the product is further stable against staling. It is not like other baked products which have, after a very short time period, the problems of staling. This product does not stale significantly and being stable against staling, is very unique, even in the baked products, and would be unique even if it did not have the protein and vitamin superiority that it has. In addition, the product of this invention has superior stability against microbial growth and is excellent as a product with respect to both taste and texture.

The baked product of this invention includes a base having less than about 10% by weight wheat flour therein. In other words, the based base of this product must have no more than about 10% by weight wheat flour, including wheat starch and gluten therein. Regardless of the cereal bases used (or the cereal products used herein) the ingredients must never at any time be combined to the extent that more than about 10% by weight wheat flour is in the base. If additional wheat flour is used, then the staling problem becomes severe, texture suffers significantly and a suitable product invention is not produced. It is preferable to use 5% or less wheat flour in this invention, although one may go as high as about 10% wheat flour with a product that is within the scope of this invention although not the most preferred embodiment. Specifically, one would not use wheat gluten as the primary protein source for this invention. The protein of this invention can be selected from the group comprising egg protein, casein, caseinate salts, and vegetable protein and must contain at least some egg protein and at least some casein or caseinate salts. However, the vegetable protein cannot contribute more than about 1% by weight wheat gluten or wheat starch when combined with all other wheat flour in the product. It is critical that the protein product used in this invention must have at least some egg protein and some casein or caseinate salts as a part thereof. In other words, some egg protein must be used in the invention and some casein or caseinate salts, preferably sodium caseinate, must be used to arrive at the protein content herein. In addition, in the process of this invention the casein or caseinate salt must first be coated with the vegetable oil or fat to keep it from swelling too rapidly while mixing and thus make possible a flowable batter which can be used in the product.

The base of the product of this invention must have between 15 and 45% by weight final moisture content after baking. In other words, the product is in the intermediate moisture range and thereby gives a soft, moist product which is highly desirable in texture.

The product of this invention includes at least about 15% by weight of a stabilizing member selected from the group comprising sugar and sugar equivalents. The stabilizing member of this invention is a member selected from the group comprising sugar and sugar equivalents, but the stabilizing member must contribute at least about 5% by weight polyhydric alcohol to the total base. Preferably, the polyhydric alcohol used in this invention is glycerol. By use herein of the term "sugar" it is intended to mean any saccharide which is soluble in water to an extent that the osmotic pressure of a water solution of such a saccharide will provide the requisite bacteriostatic effect. In addition, the saccharide is required to be nontoxic. The saccharide must not provide any undesirable taste effects when used in the required concentration. It is preferred that the sugar be a low molecular weight sugar since sugars of a lower molecular weight have a more pronounced effect in increasing the osmotic pressure of a sugar solution than do sugars of a higher molecular weight. Among the sugars that may be used for this invention are the nonreducing water soluble monosaccharides; the reducing and nonreducing polysaccharides and their degradation products such as pentoses, aldopentoses, methylpentoses, ketopentoses, e.g. xylose and arabinose; rhamnose; hexoses and reducing polysaccharides; aldohexoses like glucose, galactose and mannose; the ketohexoses including fructose and sorbose; the disaccharides including maltose and lactose; the nonreducing disaccharides such as sucrose; and other polysaccharides such as dextrin and raffinose and hydrolyzed starches which contain as their constituents oligosaccharides.

By use of the term "sugar equivalents" I intend to mean a compound which can be added to the mixture to produce the same effect on osmotic pressure as would sugar. Generally the sugar equivalents include the polyhydric alcohols which are nontoxic and which do not adversely affect the taste in the concentrations specified. By the term "polyhyric alcohols" I generally inted to mean alcohols with three or more hydroxyl groups and having the general formula $HOCH_2(CHOH)_mCH_2OH$ where $m$ is a number from 1–5. Generally, these polyhydric alcohols are water soluble, have small optical rotation in water and have some sweetness to taste. Among the polyhydric alcohols that may be used in this invention are the following:

tritols:
 glycerol
tetritols:
 erythritol
 D-threitol
 L-threitol
 D,L-threitol
pentitols:
 ribitol
 xylitol
 D-arabitol
 L-arabitol
hexitols:
 allitol
 dulcitol
 sorbitol (D-glucitol)
 L-glucitol
 D,L-glucitol
 D-mannitol
 L-mannitol
 D,L-mannitol
 D-talitol
 L-talitol
 D,L-tilitol
 D-iditol
 L-iditol
heptitols:
 glycero-gulo-heptitol
 D-glycero-D-ido-heptitol
 perseitol
 volemitol
octitol:
 D-erythro-D-galacto-octitol.

The term sugar equivalent also includes the higher sugar alcohols. Glycerol, propylene glycol, and 1,3-butanediol are acceptable "sugar equivalents" and are particularly useful in this invention. As used herein, the product should contain sugar or a sugar equivalent or mixtures thereof. When using mixtures of the sugar and sugar equivalents, care must be taken to insure that the amount used reduces the osmotic pressure of the product to the extent that it imparts therein a bacteriostatic effect. The baked base of this invention must not use yeast as a leavening agent. The product must use a chemical leavening agent. In other words, by use of the term "non-yeast leavening agent" it is intended to mean a chemical leavening agent rather than yeast. By use of the term "chemical leavening agent" it is intended to mean those chemical leavening agents which are commonly used in the baking industry and which provide carbon dioxide sources in the process. For instance, it is acceptable to use soda, sodium bicarbonate, mono-calcium phosphate, and all of the other non-yeast chemical leavening agents commonly used in the baking industry.

The product of this invention includes the baked base produced by mixing the above cereal flour along with egg protein and a mixture of vegetable oil or fat and casein or caseinate salts, protein source, and water along with the sugar and sugar equivalents and other products that are desirable for baking although not necessary, such as, small amounts of emulsifier, chemical leavening (baking soda), shortening, including that used to coat the caseinate salt, vitamin $B_1$ and non-heat degraded vitamins, flavoring, and the like. It would be well within the knowledge of one skilled in the baking industry to arrive at suitable amounts of salt and flavoring depending upon the flavor of the product which he wished to prepare. After the base has been mixed and cast in a suitable mold, depending upon desired shape of the product, it is ready to bake. At this point, a topping may or may not be placed on top thereof. The dry topping mixture is say about 80% by weight sugar mixed with flavoring, such as 10% by weight cinnamon, and margarine to contribute another 10% by weight, with minor portions of other flavoring although many other mixtures having much less sugar and different flavorings and fats or oils are acceptable. After this mixture has been prepared, if it is to be used, which preferably comprises essentially sugar along with some flavoring and fatty material, it is placed on top of the base to be baked. By use herein of the term "sugar" it is intended to mean the same as that definition of sugar used hereinbefore. After the topped or untopped base mixture has been prepared, the mixture is baked according to standard procedure in the baking industry. In other words, the mixture is put in an oven, at say 350°F., for 18 to 20 minutes, and baked until it is done throughout with the baking being accomplished and completed as one would normally regard such in the industry. While the baking temperature may be varied somewhat, it is highly desirable to stay within a loose range of this temperature in order to provide the baked product. After the product base has been baked, it is coated with a frosting containing vegetable oil or fat coated vitamins especially vitamin C, and $B_{12}$. Also included in the vitamin mix can be phosphorous compound, such as tricalcium phosphate, calcium in a form such as calcium carbonate, magnesium in a form such as magnesium oxide, zinc in a form of the oxide and reduced iron and iodine, to give the minerals. In addition most of the vitamins in the frosting and especially vitamin C, are coated with a vegetable oil or fat and a frosting is prepared containing the oil and fat coated vitamins. The frosting can be prepared for example by admixing the coated vitamins with a standard icing in an amount of say about 1 part by weight coated vitamins along with about 9 parts by weight of icing or frosting and then placing the frosting icing on the product. The frosting or icing generally comprises from about 30% to about 40% by weight vegetable oil or fat, from about 10% to about 40% by weight sugar, from about 25% to about 50% by weight milk solids, and a flavoring agent as this frosting will not bleed into the product. It is preferable to use an oil such as corn oil to coat the vitamins within the process of this invention. The vitamins may be coated by a process which comprises admixing the vitamins with a fatty material comprising a saturated aliphatic acid as herein before described or a glyceride having the formula heretofore described, and mixing the fatty material vitamin mixture with a cooling agent having a temperature below 32°F. until the mixture is solidified, then subdividing the solidified mixture until it will pass through a No. 20 U.S. Sieve screen but have a particle size above 75 microns diameter, and then subliming the cooling agent or else evaporating the cooling agent. Of particular use in this invention are the cooling agents dry ice and liquid nitrogen.

It must be noted that the base of this product contains the vitamin $B_1$ along with other vitamins that are non-heat degradable. Vitamin $B_1$ normally does not survive a baking process and this is especially so in a system slightly alkaline. Since vitamin $B_1$ normally does not survive a baking process, it is not present in most baked products. The unique combination in the base of this invention, however, provides a base that is baked and yet contains appreciable amounts of vitamin $B_1$. This is the first known baked product so providing vitamin $B_1$ therein.

Of particular importance in this invention is the process wherein equal parts of egg protein and sodium caseinate provide the protein source. Also, it is preferable in this invention to have a final moisture content of about 20 to 23% by weight. Also, additionally, it is preferable in this invention to have from 10–20% by weight sugar, e.g. sucrose, in the base of the product of this invention along with about 5% by weight glycerol in the base of the product of this invention.

The product of this invention must have a water activity coefficient, $A_w$, of less than 0.87 and preferably from 0.65 to 0.87 with the most preferred range from 0.8 to 0.85 and any substantial deviation above this level will produce a product which is undesirable.

Although it is not absolutely necessary, it is extremely desirable within this invention, to guarantee the absolute maintenance of vitamin potency and protein efficiency ratio, to package the product in a special manner. The packaging procedure of this invention, while contributing to stability of the product against some microbial growth, also provides for a product that is stable in protein content and vitamin potency. The process used for packaging and the packaging system of this invention includes placing the coated baked product in a container, displacing the air in the container with a hydrogen containing atmosphere, having not more than about 4% by weight oxygen, and sealing the container to prevent further oxygen from reaching the product. The container may be any type of container that may be flushed to remove the oxygen therefrom. It is particularly desirable to have a light and air impermeable container such as light and air impermeable coated plastics that are inert to the product and which may be sealed along three sides with flushing of the air being accomplished through the open side.

After the product is placed in the container, along with a water converting catalyst, the atmosphere is displaced therefrom. The catalyst may be either placed in the package wall or else in a separate strip placed in the container, the water containing catalyst generally being a product such as a noble metal, including titanium salts and palladium, which will convert oxygen and hydrogen to water and thereby remove all the remaining oxygen from the atmosphere. The atmosphere used to displace the oxygen from the container is one containing sufficient hydrogen to combine with the remaining 4% or less oxygen and convert it entirely to water. The inert gas that must be used along with the hydrogen is an inert gas that will not react with the product or the vitamins or protein therein to cause degradation of these constituents. The gas, for instance, can be a mixture of about 7% hydrogen in nitrogen. The air should be flushed from the package so that no more than about 2% by weight air, and consequently, no more than about 2% by weight oxygen remain in the container. Any more oxygen than this will result in too much oxygen to be converted in the requisite time period to provide an acceptable product. After the product has been put in the container, the oxygen is removed by displacing it with the hydrogen containing atmosphere, then the container is sealed to prevent further oxygen from reaching the product. In other words, air tight sealing will accomplish the desired result and is particularly acceptable if additionally the container has a slight pressure thereon to assure that no air will leak into the product. With this type of packaging, the product is assured to have a long life of protein stability and of vitamin stability.

In addition, another process may be used for packaging the system to give even a higher degree of stability than is found in normal packaging. In this process the product is first placed in a container and flushed with an inert gas such as nitrogen until most of the air and oxygen therein are displaced by the inert gas. Next, a second flushing step is undertaken in which an inert gas is flushed into the container to remove substantially all, i.e. greater than 99% of the oxygen therefrom, and the container is sealed while this flushing is accomplished to insure that the final atmosphere in the sealed container has less that 1% by weight oxygen therein.

DESCRIPTION OF THE PREFERRED EMBODIMENTS

This invention may be more fully described, but is not limited by the following examples.

EXAMPLE 1

A dough is prepared by making a better by first admixing 10 parts of weight shortening with 9 parts by weight sugar, and 9 parts by weight sodium caseinate. Next, 6 parts by weight wheat flour admixed with 6 parts by weight oat flour, ¼ part by weight salt, 4 parts by weight egg, ½ part by weight baking soda, 22 parts by weight water, 12 parts by weight glycerol, and a flavoring comprsing 7 parts by weight vanilla with 4 parts by weight water and vitamins including vitamin $B_1$ and vitamin A, vitamin $D_2$, vitamin C, vitamin $B_2$, vitamin $B_6$, and minerals tricalcium phosphate, calcium carbonate, magnesium oxide, zinc oxide, reduced iron. The above mixtures are mixed thoroughly until completely uniform. A topping is produced by mixing 8 parts by weight sugar, 10 parts by weight cinnamon, and 10 parts by weight margarine. 15 parts by weight of the filler is placed on top of 70 parts by weight of the batter dough above. The product is then baked at 350°F. for 19 minutes. A frosting is prepared by admixing 35 parts by weight vegetable oil, 35 parts by weight sugar, 30 parts by weight nonfat dry milk solids and flavoring, and adding oil coated vitamin C, vitamin $B_{12}$ and iodine to the mixture. The frosting is then added in amounts of 15 parts by weight icing to 85 parts by weight base. The product, upon cooling, is placed in a flexible bag and a strip of permeable material having palladium catalyst sandwiched therebetween in inserted along with the baked product into the air impermeable bag. The bag is then flushed with a mixture of nitrogen and 8 percent hydrogen to essentially evacuate the air therein. The product is then sealed, and after 6 weeks of storage is highly nutritional still having essentially the same protein content and essentially the same vitamin potency. A highly nutritious good tasting, good texture product is thereby produced.

EXAMPLE 2

Example 1 was repeated with the exception that the dough was produced from a batter made by admixing 8 parts by weight shortening, ¾ parts by weight wheat flour having no more than about 5 percent by weight gluten therein, 10 parts by weight sugar, 5 parts by weight glycerol, ⅓ parts by weight salt, 6 parts by weight sodium caseinate, 9 parts by weight egg, ¾ parts by weight baking soda, and a flavoring. The remaining portion of the process was repeated and the resulting product was found to be highly acceptable, both in taste and texture, and to have a good protein efficiency ratio and vitamin potency after 6 weeks of storage.

EXAMPLE 3

Example 1 was repeated except 1 part by weight of the vitamins was mixed with 4 parts by weight corn oil and this mixture was mixed with 4 times its weight of dry ice until the mixture was solidified. This mixture was then subdivided until it passed through a No. 20 U.S. Sieve but had a particle size above 100 microns, and the dry ice was allowed to sublime. The vitamin mixture, having coated thereon the corn oil, was then used in the frosting or icing of the product and the resulting product had very stable vitamins therein and was good tasting.

It may be seen that the new and novel product of this invention has amazing properties. First, the product is among the first known baked bread-like products having stability against staling. Secondly, the product has a stable protein efficiency ratio after weeks of storage. Third, the product has vitamin potency stability after weeks of storage whereas baked products have never before had this type of stability. In addition to these tremendous benefits, the product is also stable against microbial growth. Still further additional to the tremendous advantages of nutrition and vitamin and mineral content, along with stability, this product has an exceptional taste and texture and is readily acceptable as a superior baked product.

The product of this invention is new and unique in many, many areas. The advances made possible by the invention disclosed herein in combination constitute the greatest advance ever recorded in the baking industry when taken as a combination. The fact that a baked product can have shelf stability, be low in cholesterol, be low in calories and also high in nutrition, be low in reducing sugars, be low in wheat flour, have stable vitamin C in the coating and stable vitamin $B_1$ in a baked base in combination makes the most significant advance ever recorded in the baking industry. As such, this truly new and unique invention has satisfied needs long felt for many centuries.

Having fully defined this new and unique invention, the following is claimed:

1. A highly nutritional baked product, containing proteins and vitamins, stable against loss of protein efficiency ratio and vitamin potency, and further stable against staling and microbial growth, said baked product comprising: a baked base having less than about 10 percent by weight wheat flour therein and comprising cereal flour, non yeast chemical leavening, sufficient protein from a protein source to give a minimum protein content in the total product of 9 percent by weight, said protein source comprising a member selected from the group consisting of egg albumin, casein, caseinate salts, and vegetable protein, with said vegetable protein not contributing more than 10 percent by weight wheat flour when combined with all other wheat flour in the product and said protein source having both egg protein and casein or caseinate salts as a part thereof, water in an amount sufficient to give a final moisture content of the baked product of from 15 percent to 45 percent by weight, vitamins, minerals and at least about 15 percent by weight of a stabilizing member selected from the group consisting of sugar and sugar equivalents with the stabilizing member including polyhydric alcohol in an amount sufficient to provide at least 3 percent by weight of the total base; and a frosting containing vegetable oil coated vitamins or fat coated vitamins, said base comprising a major portion by weight of the product, and said product having a water activity coefficient, $A_w$, of less than 0.87, said product being the product of the process in which said base is first baked and then coated with said frosting.

2. A baked product as in claim 1 wherein said base has thereon a sugar containing topping.

3. A baked product as in claim 1 wherein said base contains added vitamin $B_1$ and said frosting contains vitamins C and $B_{12}$ and iodine.

4. A baked product as in claim 1, wherein the vegetable oil or fat coated vitamins comprise vitamins coated with a fatty material, said fatty material comprising a saturated aliphatic acid having between 12 and 20 carbon atoms inclusive or a glyceride having the formula:

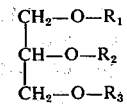

wherein $R_1$ is an acyl radical derived from a saturated aliphatic acid having between 12 and 20 carbon atoms per molecule, and $R_2$ and $R_3$ are hydrogen or the same as $R_1$, said fatty material having a melting point of from 100°F. to 200°F.

5. A baked product as in claim 1 which is enclosed by an air impermeable container containing a water converting catalyst and surrounded by a hydrogen containing atmosphere in the container having no more than about 4 percent by weight oxygen.

6. A baked product as in claim 1 where the frosting comprises from about 30 percent to about 40 percent by weight vegetable oil or fat, from about 10 percent to 40 percent by weight sugar, from about 25 percent to about 50 percent by weight milk solids and a flavoring agent.

7. A highly nutritional baked product, containing protein and vitamins, stable against loss of protein efficiency ratio and vitamin potency, and further stable against staling and microbial growth, said product being shelf stable, not requiring refrigeration for preservation, said product further being low in calories, high in nutrition, low in cholesterol, and low in reducing sugars, said baked product comprising: a baked base having less than about 10 percent by weight wheat flour therein and comprising between 5 percent and 15 percent by weight cereal flour, non yeast chemical leavening, sufficient protein from a protein source to give a minimum protein content in the total product of 9 percent by weight, said protein source comprising at least 4 percent by weight, based on the weight of the base, of a caseinate salt and at least 4 percent by weight, based on the weight of the base, of egg or egg parts, water in an amount sufficient to give a final moisture content of the baked product of from 15 percent to 25 percent by weight, from 3 percent to 15 percent by weight glycerol, added vitamins, and from 10 percent to 20 percent by weight sugar; and a frosting containing vegetable oil coated vitamins or fat coated vitamins, said base comprising a major portion by weight of the product, and said product having a water activity coefficient, $A_w$, of less than 0.87, said product being the product of the process in which said base is first baked and then coated with said frosting.

8. A process for producing a highly nutritional baked product, containing protein and vitamins, stable against loss of protein efficiency ratio and vitamin potency, and further stable against staling and microbial growth, said product being shelf stable, not requiring refrigeration for preservation, said product further being low in calories, high in nutrition, low in cholesterol, and low in reducing sugars, said process comprising:

A. preparing a base having therein less than about 10 percent by weight wheat flour by admixing cereal flour, non yeast chemical leavening, protein, water, vitamins and a stabilizing member, said protein containing some egg protein and some casein or caseinate salts, said casein or caseinate salts being first coated with a vegetable oil or fat and said protein comprising a protein material selected from the group egg protein, casein and caseinate salts, and vegetable protein, said water being admixed in an amount sufficient to give a total moisture content in the final product of from 15 percent to 45 percent by weight, and said stabilizing member contributing at least about 4 percent by weight polyhydric alcohol to the total base and comprising a member selected from the group sugar and sugar equivalents;

B. baking the base; and

C. coating a portion of the baked base with a frosting containing vegetable oil coated vitamins or fat.

9. A process as in claim 8 wherein the frosting comprises vitamins coated with a fatty material with said fatty material comprising a saturated aliphatic acid having between 12 and 20 carbon atoms inclusive or a glyceride having the formula:

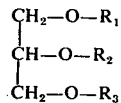

wherein $R_1$ is an acyl radical derived from a saturated aliphatic acid having between 12 and 20 carbon atoms per molecule, and $R_2$ and $R_3$ are hydrogen or the same as $R_1$, and wherein the fatty material has a melting point of from 100° to 200°F.

10. A process as in claim 8 further including placing a water converting catalyst and the coated baked product in a container, displacing the air in the container with a hydrogen containing atmosphere having not more than about 4 percent by weight oxygen, and sealing the container to prevent further oxygen from reaching the product.

11. A process as in claim 9 further including placing a water converting catalyst and the coated baked product in a container, displacing the air in the container with hydrogen containing atmosphere having not more than about 4 percent by weight oxygen, and sealing the container to prevent further oxygen from reaching the product.

12. A process as in claim 8 further including placing the product in a container, flushing the atmosphere with an inert gas to remove a major portion of the oxygen therefrom and then again flushing the container with an inert gas until no more than 10 percent by weight of the atmosphere therein is oxygen and then sealing the container to prevent additional oxygen from reaching the product.

13. A process as in claim 8 further including putting a sugar containing topping on the base before baking.

14. A process as in claim 8 wherein said base contains added vitamin $B_1$ and said frosting contains vitamins C and $B_{12}$ and iodine.

15. A process as in claim 8 wherein the frosting comprises from about 30 percent to about 40 percent by weight vegetable oil or fat, from about 10 percent to 40 percent by weight sugar, from about 25 percent to about 50 percent by weight milk solids and a flavoring agent.

16. A process for producing a highly nutritious baked product containing protein and vitamins, stable against loss of protein efficiency ratio and vitamin potency and further stable against staling and microbial growth, said product being shelf stable, not requiring refrigeration for preservation, said product further being low in calories, high in nutrition, low in cholesterol, and low in reducing sugars, said process comprising:

A. preparing a base having therein less than about 10 percent by weight wheat flour by admixing cereal flour, non yeast chemical leavening protein, water, and a stabilizing member, said protein comprising egg protein and vegetable oil or fat coated sodium caseinate each in an amount sufficient to contribute at least 4 percent by weight of the base and said water being admixed in an amount sufficient to give a total moisture content in the final product of from 15 percent to 25 percent by weight, and said stabilizing member comprising at least 4 percent by weight, based on the weight of the base, of glycerol and at least 10 percent by weight, based on the weight of the base, of sugar, and added vitamins;

B. baking the base;

C. coating a portion of the baked base with a frosting containing a vegetable oil coated vitamins or fat coated vitamin;

D. inserting the coated product into a container along with a water converting catalyst;

E. displacing the atmosphere in the container with a hydrogen containing atmosphere containing not more than about 4 percent by weight oxygen; and F. sealing the container to prevent further oxygen from reaching the material.

17. A process for producing a highly nutritional baked product, containing protein and vitamins stable against loss of protein efficiency ratio and vitamin potency, and further stable against staling and microbial growth, said product being shelf stable, not requiring refrigeration for preservation, said product further being low in calories, high in nutrition, low in cholesterol, and low in reducing sugars, said process comprising:

A. preparing a base having therein less than about 10 percent by weight wheat starch by admixing cereal flour, non yeast chemical leavening, protein, water, vitamins and a stabilizing member, said protein containing some egg protein and some vegetable oil or fat coated casein or caseinate salts and comprising a protein material selected from the group egg parts, vegetable oil or fat coated casein and caseinate salts, and vegetable protein, said water being admixed in an amount sufficient to give a total moisture content in the final product of from 15 percent to 45 percent by weight, and said stabilizing member contributing at least about 3 percent by weight polyhydric alcohol to the total base and comprising a member selected from the group sugar and sugar equivalents;

B. baking the base;

C. preparing fat coated vitamins by admixing from 5 to 50 parts by weight vitamins with from 95 to 50 parts by weight of edible liquified fatty material with a cooling agent, said cooling agent having a temperature below 32°F., said cooling agent being admixed in an amount sufficient to solidify the mixture and maintain the mixture solidified throughout the vitamin coating process, with said cooling agent being nontoxic and chemically inert with respect to the vitamins and fatty material; subdividing the total fatty material-vitamin mixture until a major portion thereof passes through a No. 20 U.S. Sieve but has a particle size above 100 microns; and removing the cooling material therefrom by sublimation of evaporation;

D. adding the fat coated vitamins to a frosting; and

E. coating a portion of the baked base with the frosting containing the fat coated vitamins.

18. A process for producing a highly nutritious baked product containing protein and vitamins, stable against loss of protein efficiency ratio and vitamin potency and further stable against staling and microbial growth, said product being shelf stable, not requiring refrigeration for preservation, said product further being low in calories, high in nutrition, low in cholesterol, and low in reducing sugars, said process comprising:

A. preparing a base having therein less than about 10 percent by weight wheat flour by admixing cereal flour, non yeast chemical leavening, protein, water, vitamins and a stabilizing member, said protein comprising egg protein and vegetable oil or fat coated sodium caseinate each in an amount sufficient to contribute at least 4 percent by weight of the base and said water being admixed in an amount sufficient to give a total moisture content in the final product of from 15 percent to 25 percent by weight, and said stabilizing member comprising at least 4 percent by weight, based on the weight of the base, of glycerol and at least 10 percent by weight, based on the weight of the base, of sugar;

B. baking the base;

C. preparing fat coated vitamins by admixing from 5 to 50 parts by weight vitamins with from 95 to 50 parts by weight of edible liquified fatty material with a cooling agent, said cooling agent having a temperature below 32°F., and said cooling agent being admixed in an amount sufficient to solidify the mixture and maintain the mixture solidified throughout the vitamin coating process, with said cooling agent being nontoxic and chemically inert with respect to the vitamins and fatty material; subdividing the total fatty material vitamin mixture until a major portion thereof passes through a No. 20 U.S. Sieve but has a particle size above 100 microns; and removing the cooling material therefrom by sublimation or evaporation;

D. adding the coated vitamins to a frosting;

E. coating a portion of the baked base with the frosting containing the vegetable oil coated vitamin or fat coated vitamin;

F. inserting the coated product into a container along with a water converting catalyst;

G. displacing the atmosphere in the container with a hydrogen containing atmosphere containing not more than about 4 percent by weight oxygen; and H. sealing the container to prevent further oxygen from reaching the material.

19. A process as in claim 18 wherein the frosting comprises from about 30 percent to about 40 percent by weight vegetable oil or fat, from about 10 percent to 40 percent by weight sugar, from about 25 percent to about 50 percent by weight nonfat dry milk solids and a flavoring agent.

20. A process as in claim 18 wherein the water converting catalyst is eliminated and displacing of the atmosphere is accomplished by a double inert gas flushing.

* * * * *